(12) United States Patent
Lindsay et al.

(10) Patent No.: US 8,122,843 B2
(45) Date of Patent: Feb. 28, 2012

(54) VEHICLE FUEL EFFICIENCY MONITOR AND SIGNALLING DEVICE

(75) Inventors: Harold Bert Lindsay, Columbus, OH (US); Jason R. Ertel, Gahanna, OH (US); Steve P. Martise, Gahanna, OH (US); Jeffrey D. Accursi, Columbus, OH (US)

(73) Assignee: Gas Saver, LLC, Columbus, OH (US)

( * ) Notice: Subject to any disclaimer, the term of this patent is extended or adjusted under 35 U.S.C. 154(b) by 247 days.

(21) Appl. No.: 12/706,741

(22) Filed: Feb. 17, 2010

(65) Prior Publication Data

US 2011/0197806 A1   Aug. 18, 2011

(51) Int. Cl.
  *B60Q 5/00* (2006.01)
  *G10K 5/00* (2006.01)
(52) U.S. Cl. ...................... 116/139; 116/28 R
(58) Field of Classification Search ............... 116/28 R, 116/56, 57, 58 R, 59, 137 R, 139, 142 FP, 116/DIG. 7; 180/335; 446/192, 193
See application file for complete search history.

(56) References Cited

U.S. PATENT DOCUMENTS

| | | | | |
|---|---|---|---|---|
| 305,213 A | * | 9/1884 | Maurise | 446/193 |
| 1,140,649 A | * | 5/1915 | Aronson | 446/193 |
| 1,200,256 A | * | 10/1916 | Steiner | 446/193 |
| 2,825,418 A | | 3/1958 | Kershman | |
| 2,966,328 A | * | 12/1960 | Burnworth | 251/14 |
| 3,318,157 A | * | 5/1967 | Browning et al. | 73/492 |
| 3,926,275 A | * | 12/1975 | Nersesian | 180/313 |
| 3,952,688 A | | 4/1976 | Merriman | |
| 3,961,598 A | | 6/1976 | Krieger | |
| 4,026,255 A | | 5/1977 | Weiler, Jr. | |
| 4,067,522 A | * | 1/1978 | Williams | 246/1 C |
| 4,077,370 A | | 3/1978 | Spangenberg | |
| 5,546,075 A | * | 8/1996 | Shimoji | 340/666 |
| 5,592,689 A | * | 1/1997 | Matthews | 2/23 |
| 6,161,497 A | * | 12/2000 | Sallee | 116/28 R |
| 7,603,228 B2 | | 10/2009 | Coughlin | |
| 2010/0186714 A1 | * | 7/2010 | Bucci | 123/396 |

FOREIGN PATENT DOCUMENTS

GB   2046355 A   * 11/1980
JP   10315856 A   * 12/1998

* cited by examiner

*Primary Examiner* — Richard A. Smith
(74) *Attorney, Agent, or Firm* — Frank H. Foster; Kremblas & Foster

(57) ABSTRACT

A fuel efficiency signal device intended to be interposed between the accelerator pedal of a vehicle and a floor below the pedal. The signal device has wedge shaped, flexible walled, self supporting air container having walls sealingly blended to adjacent walls to form the air container. The walls are a bottom wall, a fore end wall extending upwardly from the bottom wall and formed with a lateral, inwardly extending living hinge, an aft end wall extending upwardly from the bottom wall, a pair of opposite, outwardly bowed side walls extending upwardly from the bottom wall and joined to the end walls and a top wall inclined at a wedge angle to the bottom wall and joining the side walls and the end walls. A whistle extends through a wall of the air container. An adjustable air escape valve also extends through a wall of the air container device for adjustably varying the air flow rate through the air escape valve and thereby adjustably selecting a rate of accelerator pedal depression at which the whistle will emit an audible signal to the driver.

19 Claims, 6 Drawing Sheets

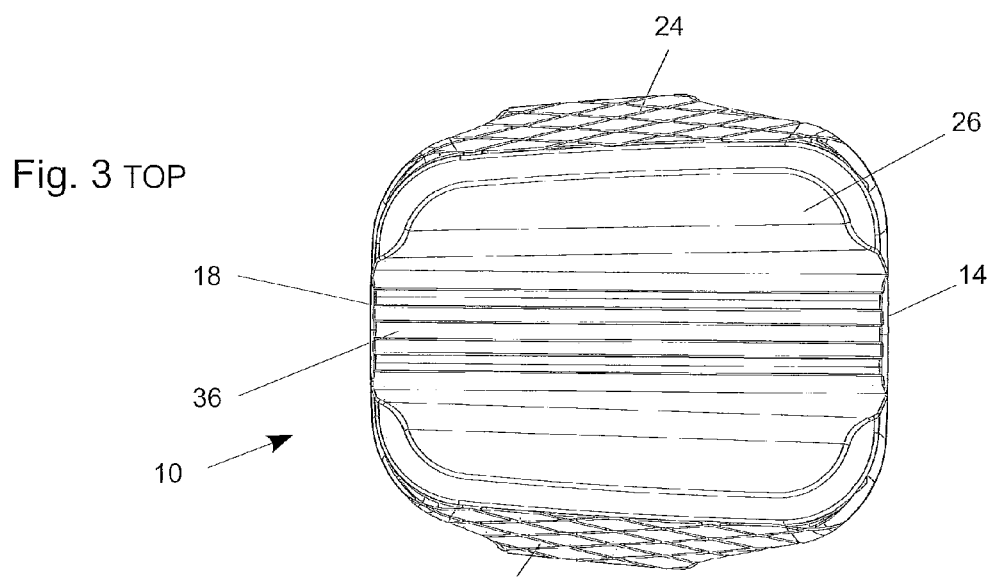
Fig. 3 TOP
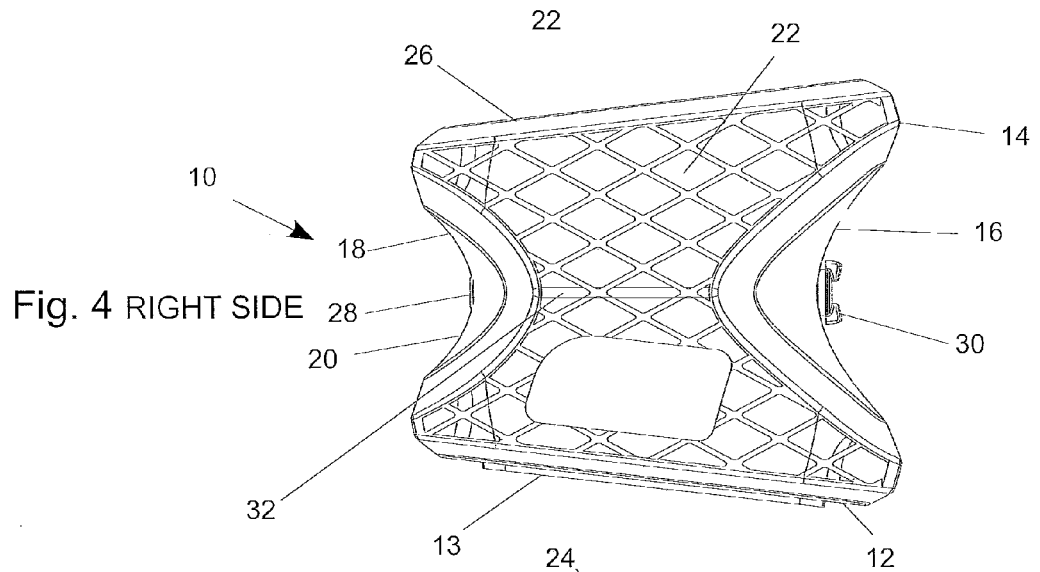
Fig. 4 RIGHT SIDE
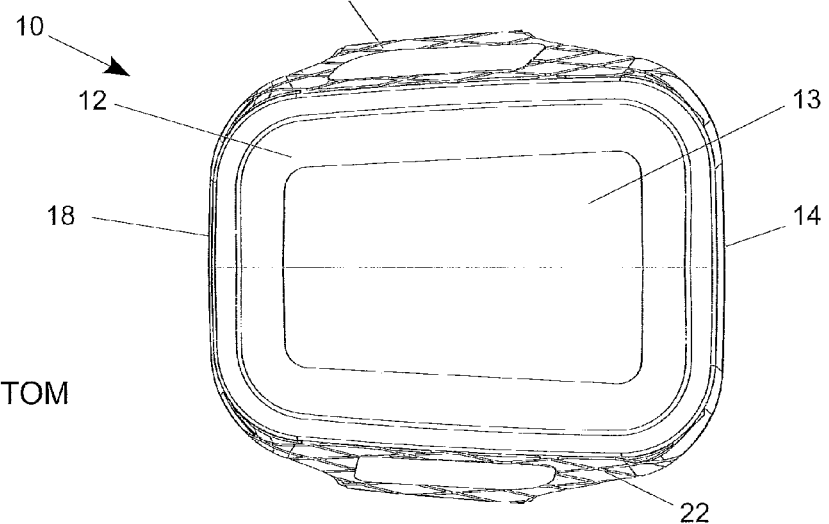
Fig. 5 BOTTOM

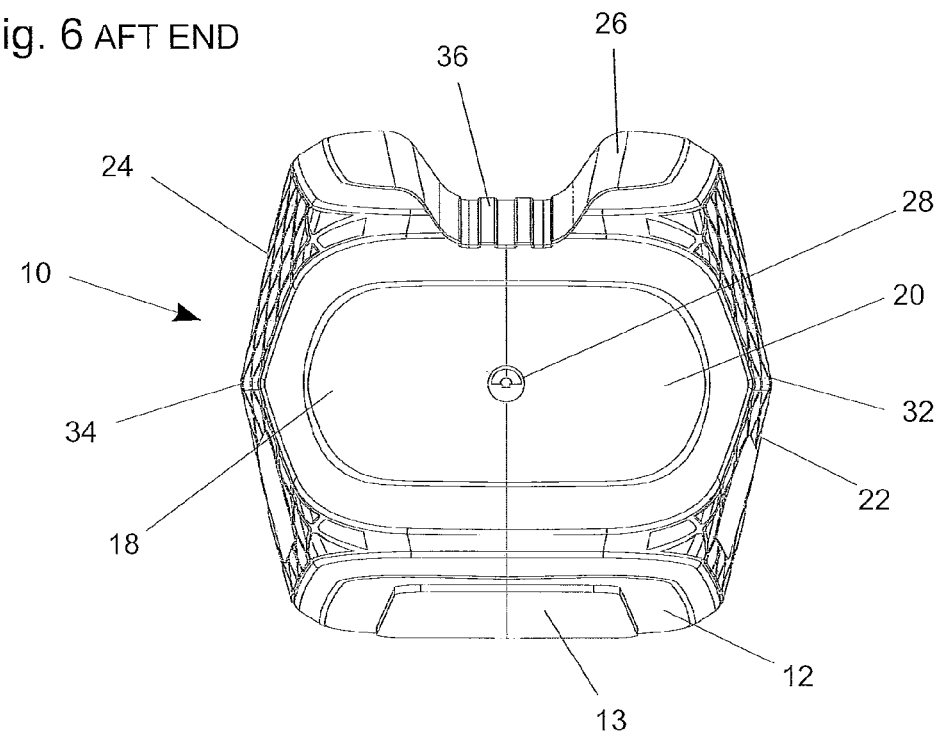
Fig. 6 AFT END
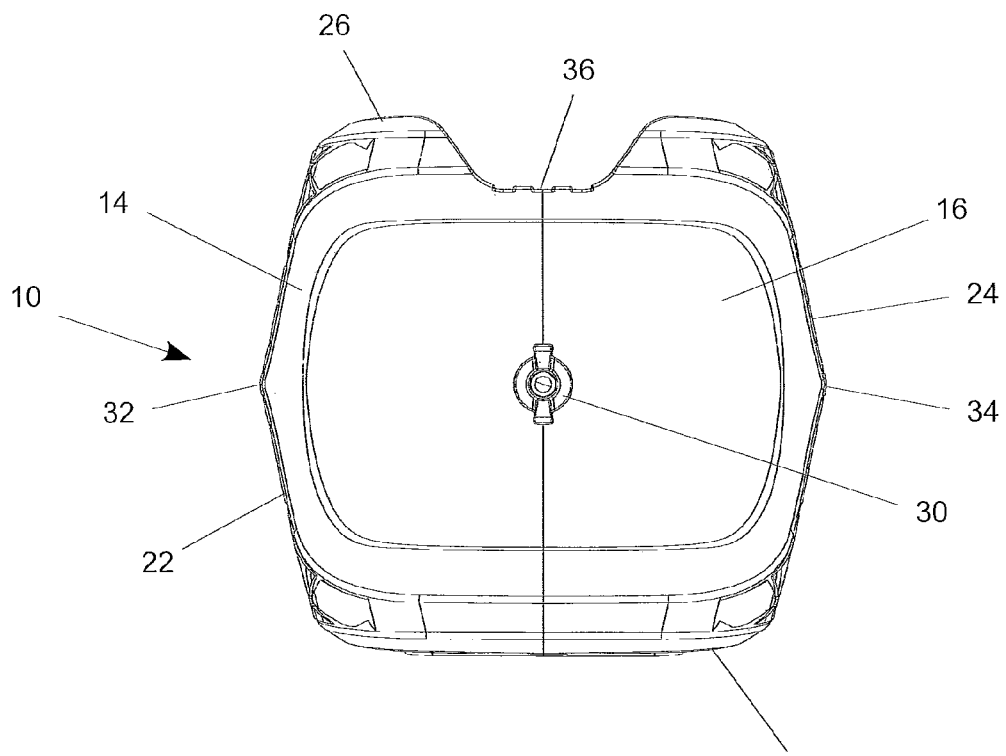
Fig. 7 FORE END

Fig. 8
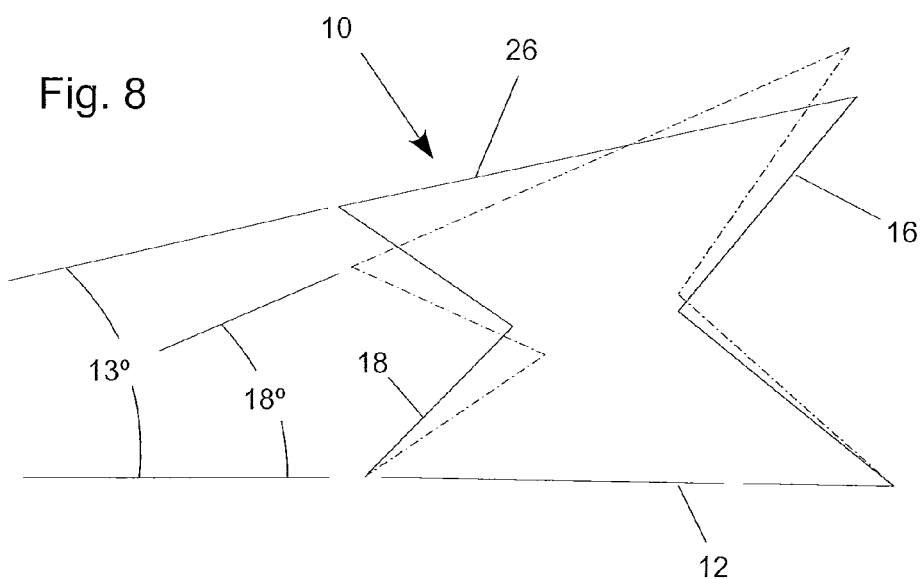
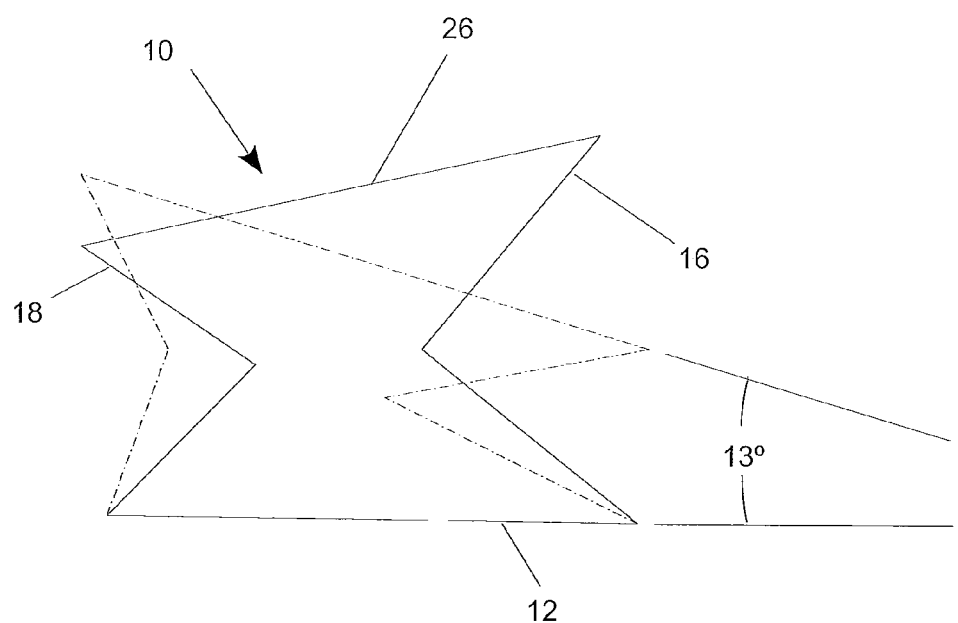
Fig. 9

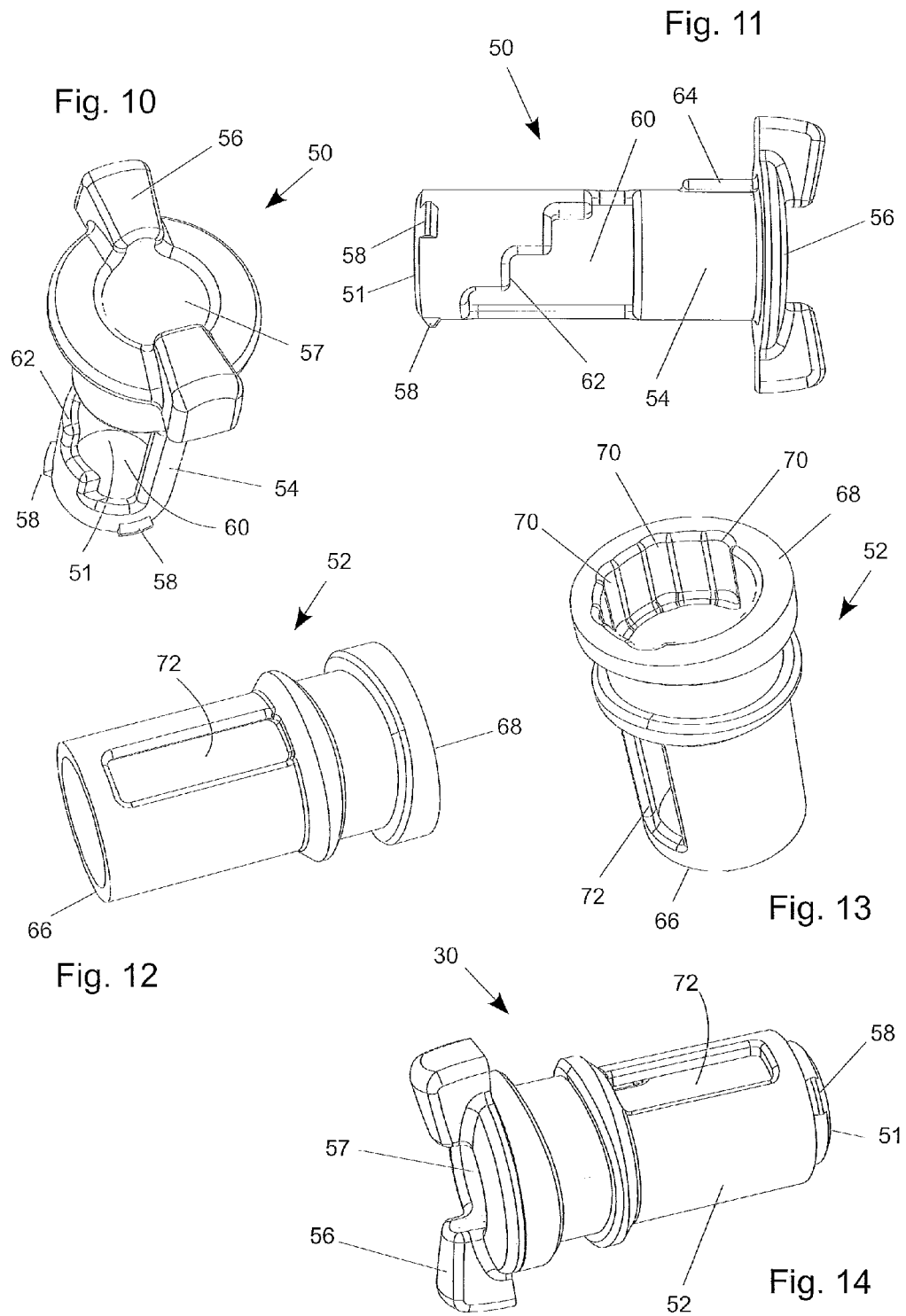

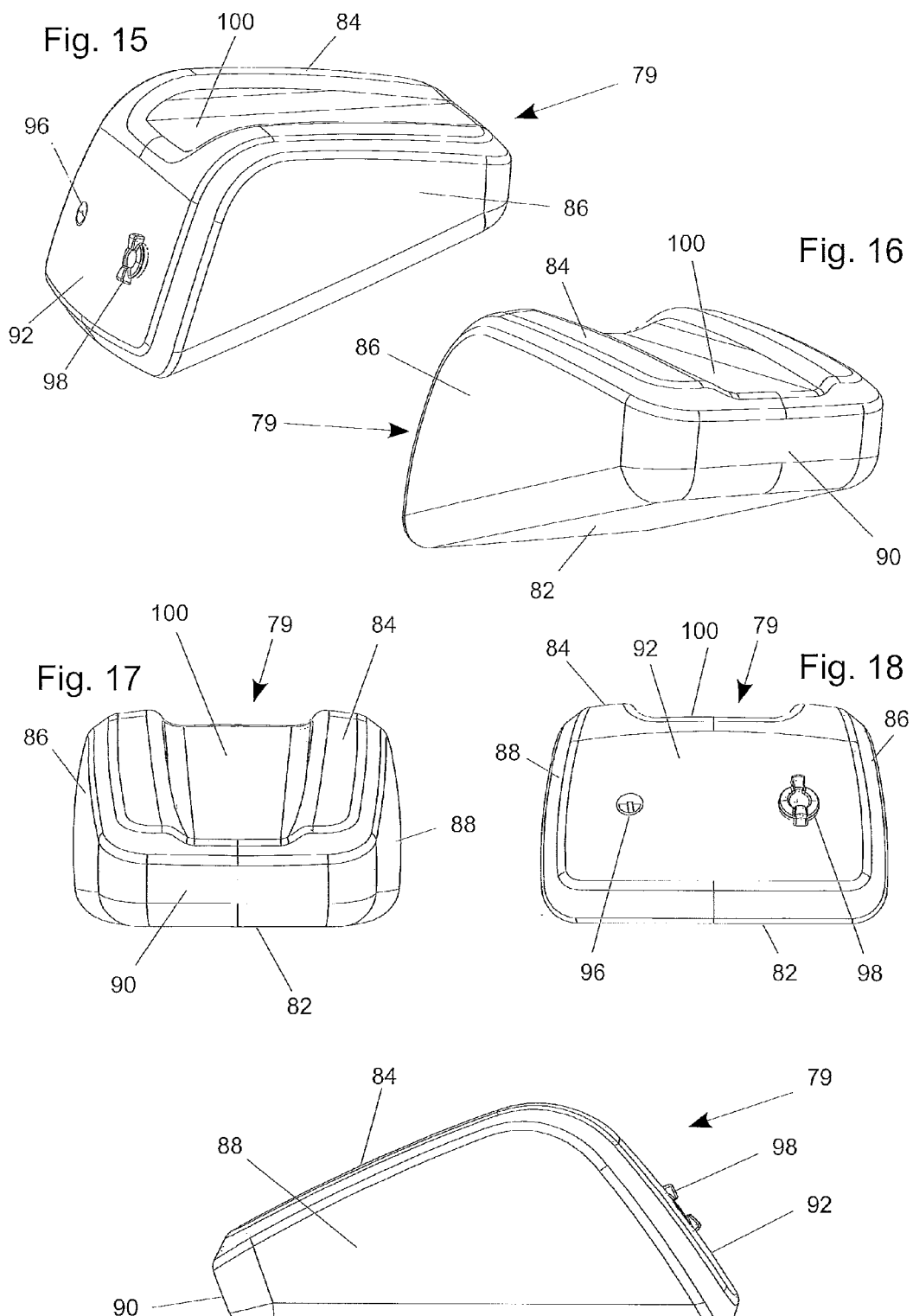

VEHICLE FUEL EFFICIENCY MONITOR AND SIGNALLING DEVICE

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to devices for signaling to the driver of a vehicle when the driver has depressed the accelerator of the vehicle at or beyond a selected rate of depression that causes fuel efficiency to fall below a selected adjustable level. More particularly the invention relates to a pneumatic device that is inserted between a vehicle accelerator pedal and the floor beneath the pedal and emits an audible signal when the selected rate of depression is exceeded.

2. Description of the Related Art

The efficient use of vehicle fuels continues to have increasing importance to both vehicle owners and the entire nation. More efficient use of fuels results in lower costs to operators and owners of motor vehicles. The prior technology has recognized that fuel economy is a decreasing function of vehicle acceleration. As a result, many devices have been proposed for improving fuel efficiency by signaling to a driver that the driver has operated an acceleration control pedal in a manner that will cause a reduction of fuel efficiency below a selected efficiency limit.

The pressure in the intake manifold of an internal combustion engine (often referred to as vacuum) has been recognized as an indicator of the amount of acceleration that a driver is seeking when the driver depresses the vehicle's accelerator. As a result, several devices have been proposed for sensing intake manifold pressure and taking some action when the accelerator has been depressed sufficiently far that fuel economy has been reduced below a desired limit. The action taken by some devices is to reduce the acceleration. That action, however, poses a risk if high acceleration is needed to avoid a safety threat. Other devices do not affect vehicle operation and instead permit the driver to maintain control but signal to a driver that fuel efficiency has declined below a selected limit. By only signaling to a driver, the device allows the driver to either reduce acceleration or override the signal and maintain the acceleration chosen by the driver. Examples of such devices are U.S. Pat. Nos. 2,825,418; 3,961,598; and 4,077,370.

One problem with devices that sense intake manifold pressure is that they require connection to the intake manifold. For an original equipment manufacturer, that can be done but increases the cost of vehicle manufacture. Installing an aftermarket device of this type is beyond the capability of an ordinary driver and would require a substantial amount of time for a skilled mechanic and therefore a substantial investment by the vehicle's owner.

The difficulty of making a connection to the intake manifold is avoided by a signaling device of the type shown in U.S. Pat. No. 3,952,688. That device is a cylindrical bellows that is attached to the underside of a vehicle accelerator pedal by a band extending over the pedal. A whistle audibly signals a driver when the accelerator is depressed at a sufficient rate to increase the internal air pressure enough to actuate the whistle. Although the device shown in the patent offers desirable features, it has deficiencies that have reduced the practicality of its adoption.

One deficiency is that the device of the patent is susceptible to being moved out of position because of the combination of the manner it is mounted in place and its configuration. Because the device is held on the accelerator pedal only by a band extending over the top of the pedal, the device can easily slide longitudinally along the pedal if a force is applied to it in the longitudinal direction of the pedal. Because the top and bottom of the device are parallel but an accelerator pedal is often at an angle to the floor, the bottom edge on one side of the device will first contact the floor beneath the pedal at the lowermost side of the bottom. Then, as the pedal is depressed further, the bottom of the device will pivot around the point of first contact until the entire bottom contacts the floor. This pivoting movement will apply to the top of the device a force that has a component longitudinally along the pedal. Therefore, each depression of the pedal can result in a very small longitudinal movement along the pedal. The cumulative effect of many depressions soon causes a noticeable longitudinal movement of the device along the pedal. Another deficiency exists if the undepressed pedal is above the underlying floor a distance greater than the height of the device causing the bottom of the patented device to be spaced above the floor. The result is that the pedal can be partially depressed without compressing the device thereby rendering the device inoperable for an initial interval of pedal depression.

Other deficiencies result from securing the device to the pedal by means of the band going across the top of the pedal. One problem is that the bellows device can easily be accidentally kicked laterally out from under the pedal by a driver's foot and rotated to one side or the other of the pedal. To safely replace it, the driver would be required to stop the vehicle. Unfortunately, some drivers would be likely to try to kick it back into place while driving thereby creating a safety hazard.

Two of the more significant problems with the device of the patent arise from its use of several adjacent pleats around its perimeter that together form a bellows arrangement. For any device that is used in connection with any control pedal for a vehicle, a designer must consider the potential consequences in the event that the device comes loose from its intended position and becomes lodged or otherwise located beneath one of the other control pedals. If that happens, the device should not cause a vehicle control problem. If the device of the patent was located beneath a control pedal in an orientation having its pleats extending between the pedal and the floor (i.e. 90° to its intended orientation), the corrugated configuration of the pleats would cause the device to apply a substantial force to a pedal that is being depressed thereby resisting its depression.

Another problem with a bellows arrangement arises because the pleats of a bellows lie one above the other. As such a bellows is compressed, the walls of the pleats move closer until they lie against each other when the bellows is fully compressed. With the bellows fully compressed, the thickness of each pleat wall adds to the thickness of the remaining pleat walls to sum to a minimum bellows height. The bellows can only compress until its pleat walls lie against each other. In the case of the patented device, this minimum height is approximately eight times the material thickness. This minimum bellows height imposes a limit on the amount of depression of the accelerator. While that is not a problem for most driving situations, in the event that a driver needs to have the highest possible acceleration in order to avoid an unexpected safety emergency, the bellows arrangement reduces the amount of accelerator depression available to the driver. Similarly, in the event that the device became positioned beneath another control pedal but in its proper orientation, it would impose the same pedal depression limitations.

It is therefore an object and feature of the invention to eliminate these deficiencies by providing a fuel efficiency signaling device that:

1. is quick and easy to install including requiring no disconnection of the linkage from the accelerator pedal to the engine's speed controlling device, such as the carburetor, fuel injection system or the speed control of an electrically powered vehicle, requiring no disconnection of a pedal pivot or any other structure and requires no connection to the accelerator pedal or linkage in order to be installed in its operable position;
2. can be manufactured in one or a very few standardized models and yet fits and operates properly and safely in the wide variety of accelerator configurations that are used in commercially available vehicles;
3. poses considerably less restraint upon the depression of control pedals in the event that the device becomes displaced from its intended position and becomes positioned beneath another pedal, regardless of its orientation;
4. does not have adjacent pleats that are characteristic of a bellows and that increase the minimum thickness of compression of the device; and
5. is more securely held in place against accidental lateral displacement and against longitudinal displacement to minimize the risk of the device being dislodged.

Further objects and features of the invention are described in the subsequent Detailed Description of The Invention.

BRIEF SUMMARY OF THE INVENTION

The invention is a fuel efficiency signal device that is interposed between the accelerator pedal of a vehicle and a floor below the pedal for signaling to a driver when an accelerator is depressed at a rate equal to or exceeding a selected rate of depression. The signal device comprises a wedge shaped, flexible walled, self supporting air container having walls sealingly blended to adjacent walls to form the air container. The walls, in one of several possible installed orientations, comprise a bottom wall, a fore end wall extending upwardly from the bottom wall and, in the principal embodiment, formed with a lateral, inwardly extending living hinge, an aft end wall extending upwardly from the bottom wall, a pair of opposite side walls extending upwardly from the bottom wall and joined to the end walls, each side wall being outwardly bowed and a top wall inclined at a wedge angle to the bottom wall and joining the side walls and the end walls. A whistle extends through a wall of the air container and has an air passage for escape of air. The whistle generates a sound when the air pressure exceeds a selected air pressure as a result of compression of the signal device by the accelerator pedal at a rate equal to or exceeding a selected rate of depression of the accelerator pedal. An adjustable air escape valve extends through a wall of the device for adjustably varying the air flow rate through the air escape valve and therefore also through the whistle. Adjusting the air escape valve selects the selected rate of depression at which a signal is emitted to signify that the pedal has been depressed at a rate that exceeds the intended fuel consumption rate.

BRIEF DESCRIPTION OF THE SEVERAL VIEWS OF THE DRAWINGS

FIG. 3 is a top view of the embodiment illustrated in FIG. 1.
FIG. 4 is a view in side elevation of the embodiment illustrated in FIG. 1.
FIG. 5 is a bottom view of the embodiment illustrated in FIG. 1.
FIG. 6 is an aft end view of the embodiment illustrated in FIG. 1.
FIG. 7 is a fore end view of the embodiment illustrated in FIG. 1.
FIG. 8 is a diagrammatic side view of the embodiment of FIG. 1 illustrating the rocking motion of the invention in the aft direction.
FIG. 9 is a diagrammatic side view of the embodiment of FIG. 1 illustrating the rocking motion of the invention in the forward direction.
FIG. 10 is a view in perspective of the inner component of the adjustable air escape valve that forms the sensitivity adjustment for the illustrated embodiments of the invention.
FIG. 11 is a side view of the inner component illustrated in FIG. 10.
FIG. 12 is a view in perspective of the outer component of the adjustable air escape valve that forms the sensitivity adjustment for the illustrated embodiments of the invention.
FIG. 13 is another view in perspective of the outer component illustrated in FIG. 12.
FIG. 14 is a view in perspective of the assembled adjustable air escape valve that forms the sensitivity adjustment for the illustrated embodiments of the invention.
FIG. 15 is view in perspective of an alternative embodiment of the invention.
FIG. 16 is another view in perspective of the embodiment of the invention illustrated in FIG. 15.
FIG. 17 is an aft end view of the embodiment illustrated in FIG. 15.
FIG. 18 is a fore end view of the embodiment illustrated in FIG. 15.
FIG. 19 is a side view of the embodiment illustrated in FIG. 15

Figure 1:
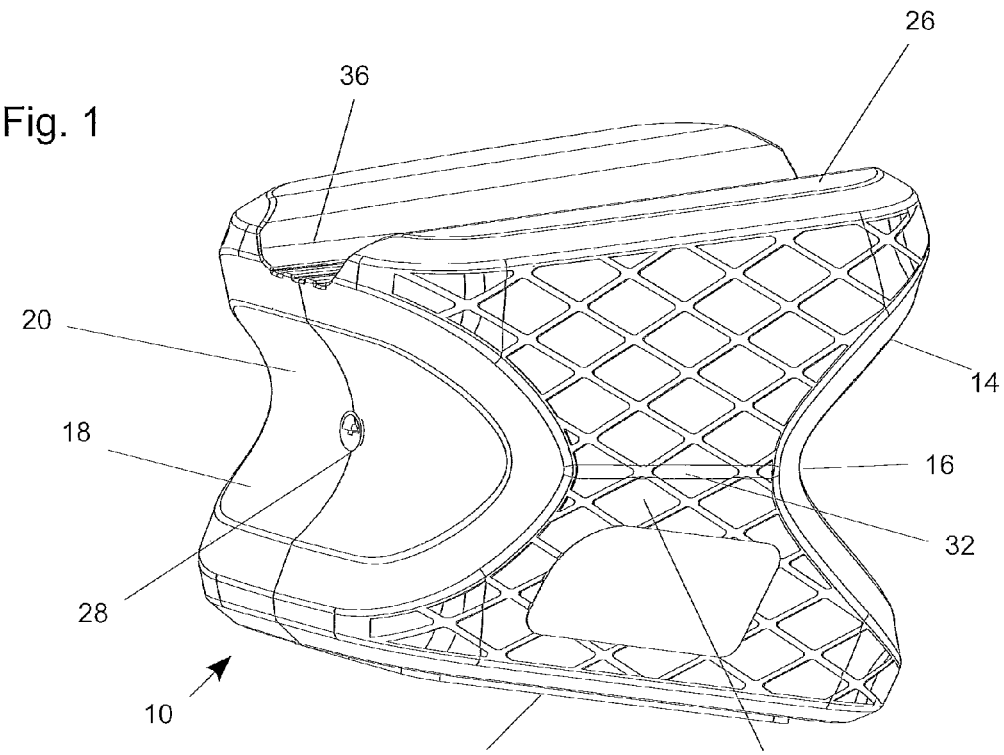
FIG. 1 is a view in aft perspective illustrating the preferred embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The device of the invention signals to a driver when the driver depresses an accelerator pedal at a rate of depression that causes inefficient fuel consumption. The device is a pneumatic device in the form of an air container that has a whistle that emits an audible signal in response to an excessive pedal depression rate and an air valve that allows the user to adjust, according to the user's preference, the minimum depression rate that generates the audible signal.

More importantly, the invention is a combination of component part shapes, component part sizes and component part arrangements that cooperate with each other, with the pedal and with the underlying floor to provide an improved pneumatic efficiency signaling device that meets the previously mentioned objects as well as additional criteria. An embodiment of the invention does not introduce a safety hazard, does not impose a limitation on the driver's ability to maintain full control of the vehicle, can be installed quickly and easily into its operable position and fits and is held firmly in position. The device of the invention operates properly with all these characteristics being present for a wide variety of different motor vehicles that have a wide range of different floor to pedal relationships.

In addition to the objects of the invention described above, there are numerous important criteria all of which should be met for all of the variety of vehicle pedal arrangements if an acceleration signaling device is to operate effectively and safely and be relatively inexpensive so that it will be accepted by the public. The device should fit in a slightly compressed state between the vehicle floor and the accelerator pedal when the pedal is not depressed in order to assist holding it in place. When the pedal is depressed, the device should apply the least possible resistive force upwardly upon the pedal. That allows the device to have the least affect upon the feel of the accelerator to the driver and avoids foot fatigue. There should be no space between the device and the accelerator pedal and no space between the floor and the device so that the resistive force applied to the pedal by the device, as the pedal is depressed, increases smoothly without an abrupt increase in the applied force at an intermediate pedal depression.

One of the most significant problems in constructing an acceleration signaling device is the wide variety of vehicle manufacturers and vehicle sizes and models which have many different pedal arrangements. These pedal arrangements differ in pedal distance to the underlying floor, in pedal angle with respect to the underlying floor, in pedal structure and in the structural configuration of the linkage between the pedal to engine's speed control device. In order for a signal device to be manufactured and sold at a sufficiently low cost, it is necessary to configure the device so that a single standard device will be operable for the maximum number of vehicle pedal arrangements and configurations.

Figure 2:
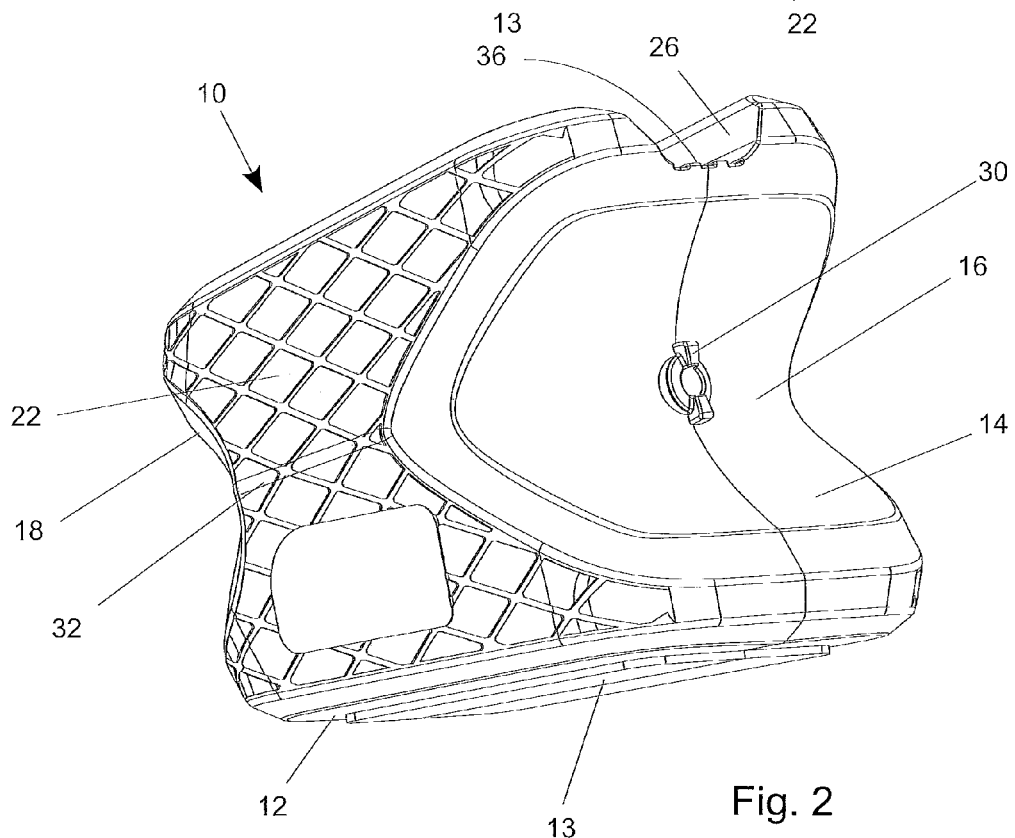
FIG. 2 is a view in fore perspective illustrating the embodiment illustrated in FIG. 1.

The preferred embodiment of the invention is illustrated in FIGS. 1 through 7 and is a wedge shaped, flexible walled, self supporting air container 10 that is formed of several walls that are sealingly blended to adjacent walls to form the air container 10. Sealingly blended means that the physical shape or configuration along the edges where adjacent walls are joined together is a smooth rounded contour and is sealed against air escape. The walls are formed of a flexible and resilient material. The walls are flexible so the device can be compressed to force air out from the container. The walls are resilient so that, after the device is compressed by the accelerator pedal and then released, the device will expand itself back to its uncompressed, relaxed state and draw in air. Preferably, the air container 10 is one unitary, solid molded piece and is compressible in all directions so that, if it becomes displaced to a location under any vehicle control pedal, it will not hinder the depression of the pedal. Preferably, the molded container is molded from a PVC plastisol containing a foaming agent.

As will be later explained, the device of the invention is capable of being operably installed in several different orientations. However, in order to facilitate the description of the invention and adopt terminology for its components, embodiments of the invention are described as if they were operably installed in one of their possible orientations. Specifically, the device is described in an orientation with its longitudinal axis aligned parallel to the longitudinal direction of the vehicle accelerator pedal, with the higher end of its wedge shape nearer the front of the vehicle and with the shorter end of its wedge shape nearer the rear of the vehicle. However, this terminology is selected only for convenience and the device can be operably installed with its fore and aft ends in the reverse orientation and it can be inverted so that the wall that is described as the top wall can be located on the bottom beneath the wall that is described as the bottom wall. One of the major advantages of the invention is that it fits numerous vehicles. That universality is possible in part because of the multiple different orientations in which it can be installed.

Referring to FIGS. 1 through 7, the air container 10 has a bottom wall 12 that, in many installations, rests upon the floor of a vehicle directly below the accelerator pedal. Optionally, one of the usual two mating patches of a conventional hook and loop fastener 13 may be adhered to the exterior of the bottom wall 12 to provide, if needed or desired, a way to fasten the device to the vehicle floor beneath the pedal. Desirably, the patch with the hooks is adhered directly to the bottom wall 12 so that it alone can be used to attach to a carpet if the hooks provide sufficient attachment strength. For some vehicles, such as those with pedal adjustment, some people may adjust the pedal to a position resulting in a large floor to pedal spacing that exceeds the capability of the signal device of the invention to be in contact with and slightly compressed between the pedal and the floor. For that situation, both of the usual two mating patches of a conventional hook and loop fastener, or an alternative fastener, would become desirable.

A fore end wall 14 extends upwardly from the forward end of the bottom wall 12. The fore end wall 14 is formed to include a lateral, inwardly extending living hinge 16. An aft end wall 18 extends upwardly from the opposite, aft end of the bottom wall 12 and, in the preferred embodiment, also includes a lateral, inwardly extending living hinge 20. Both end walls 14 and 18 are connected to the bottom wall 12 in a smoothly blended manner.

A pair of opposite side walls 22 and 24 extend upwardly from the bottom wall 12. These side walls 22 and 24 are joined in a smoothly blended manner to the end walls 14 and 18 and to the bottom wall 12. Each of the side walls 22 and 24 is outwardly bowed. A top wall 26 is inclined at an angle to the bottom wall 12 to define the wedge shape and joins the side walls 22 and 24 and the end walls 14 and 18 in a smoothly blended manner.

An audible signal preferably in the form of a whistle 28 is mounted in a hole formed through the aft end wall 18. The whistle 28 is a conventional whistle having an air passage for escape of air through the whistle and past its vibrating reed to generate a sound when the air pressure becomes sufficient as a result of compression of the signal device by the accelerator pedal. The preferred whistle is commercially available from Suntech Toys and is part number ST-600. The whistle 28 may be any of the well known devices in which an stream of air causes a volume of air to vibrate with alternating pressure variations. The whistle 28 is a one way whistle that is oriented in the opening through the aft end wall 18 in the direction that allows it to emit its audible signal only when air flows out of the container 10. This orientation permits the sound to be emitted only when the accelerator pedal is being depressed to accelerate the vehicle. It would be undesirable and annoying if a sound were emitted whenever the pedal is released and the device expands as air flows back into the device.

A sensitivity adjustment valve 30 is mounted in a hole formed through a wall of the device and preferably through the center of the living hinge 16 of the fore end wall 14. The sensitivity adjustment valve 30 is adjustable to variably control the air flow rate through the valve 30 and is discussed in more detail below.

The basic operation of the embodiment illustrated in FIGS. 1 through 7 will now be described and is followed by a description of detailed structural features of the invention. An understanding of the function and operation of the invention is desirable for obtaining an understanding of the detailed features and the reasons for and advantages of their configurations.

The air container device 10 is inserted between the accelerator pedal and the floor of a vehicle and is preferably in contact with both. The device is most commonly inserted in an orientation that has at least a portion of the top wall against the underside of the pedal and the bottom wall in contact with the floor. Preferably, and for most vehicles, the device is slightly compressed when in place beneath a pedal that is not depressed. Typically, the higher fore end wall 14 is oriented toward the front of the vehicle and the lower aft end wall 18 faces toward the rear of the vehicle. If desired, or in the rare instance when the device does not contact both the pedal and the floor, the hook and loop fastener may be used to fasten the device to the floor. No further installation steps are needed.

After installation, the driver should test drive the vehicle. Upon depression of the accelerator pedal toward the vehicle floor, the air container device 10 is compressed between the pedal and the floor thereby compressing the air within the device 10. Compression of the device increases the air pressure within the device which forces air out of the device through the whistle 28 and through the sensitivity adjustment valve 30. The rate at which the pressure increases is proportional to the rate at which the pedal is depressed. If the pressure increases sufficiently to cause the whistle to emit a sound, the driver hears an audible signal. This allows the driver to choose to reduce the pedal depression in order to reduce vehicle acceleration.

Whenever the pedal is being depressed at some rate of depression, the rate of pressure increase is a decreasing function of the cross-sectional area of the air path through the sensitivity adjustment valve 30. Consequently the driver is able to adjust the sensitivity adjustment valve 30 by changing the cross-sectional area of the air path through the valve 30 and thereby adjust the rate of pedal depression that causes the audible signal to be emitted by the whistle. Opening the valve 30 further to increase the cross-sectional area makes the device less sensitive and closing the valve further increases the sensitivity. In that way the driver is able to adjust the sensitivity to a sensitivity that the driver wants to maintain. A driver may wish to initially choose a lower sensitivity and then increase the sensitivity as the driver becomes accustomed to using the device and responding to the signals it provides.

The structural features of the component walls of the device are an important part of the invention because they provide significant enhancements for the ease of operation, effectiveness, universality and safety of embodiments of the invention.

There are two basic kinds of accelerator pedal and fuel control linkage configurations that are common on modern vehicles. One is the standard overhead linkage that is typical in American manufactured vehicles. The overhead linkage has a pedal that is not attached to the vehicle floor. Instead the pedal is attached only to a linkage rod that approaches the pedal from above it. The other configuration has a pedal that is hinged to the floor near its aft end and has a linkage rod attached to the underside of the pedal and extending down through a hole in the floor beneath the pedal. The embodiment of the invention illustrated in FIGS. 1 through 7 is intended primarily for use with the overhead linkage configuration.

End walls. The end walls 14 and 18 have living hinges 16 and 20 to provide rockability; that is the living hinge configuration provides the ability of the device to be rocked fore and aft with minimum resistant force. The living hinges 16 and 20 are described as lateral because they extend laterally from side wall 22 to side wall 24. They are formed by v-shaped but rounded end wall portions that extend inwardly into the interior of the container 10.

Side walls—The side walls 22 and 24 are outwardly bowed so they will flex outwardly as the device is compressed by the accelerator pedal. That shape minimizes the device's stiffness and resistance to pedal depression because the force applied to the pedal by the device is minimized. If the sidewalls were straight, they would act more like pillars and cause additional resistance to pedal depression. The outwardly bowed contour of the side walls also assures that the side walls will not move inwardly against the living hinges during compression. If the sidewalls moved inwardly, they could seat against and/or slide frictionally against a portion of the end walls during compression. That would increase the resistance of the device to compression and require application of a greater force to the pedal by the driver. Additionally, movement of the sidewalls inwardly during compression could also interfere with air flow through the whistle 28 or the sensitivity valve 30. Movement of the side walls outwardly during compression is safe because there is no obstruction laterally to the left or right of an accelerator pedal that is close enough to be contacted by an outwardly expanding side wall.

As most visible in FIGS. 6 and 7, the preferred outwardly bowed shape of the side walls 22 and 24 is that, in lateral cross section, the side walls 22 and 24 have a blended V shape and in planes generally parallel to the bottom wall 12 the side walls 22 and 24 curve from the fore end wall 16 to the aft end wall 18. The V shape provides a sharp intersection between the upper and lower portions of the side walls 22 and 24 to define fold lines 32 and 34 that help assure that the side walls fold and move outwardly when the device is compressed.

Top and bottom walls. The bottom wall 12 and the top wall 26 are generally in planes that intersect at a wedge angle to provide the wedge shape to the device. The wedge shape enhances the operating characteristics of the device and allows it to have different orientations that permit the device to fit properly with a wider variety of accelerator pedal configurations.

As described previously, it is desirable that the device fit properly under as many as possible of the wide range of accelerator pedal configurations that exist on the many makes and models of vehicles. Sometimes the heel (aft) end of the pedal is spaced farther from the floor than the toe (fore) end, and sometimes the pedal ends have the opposite spacing. The wedge shape permits the device of the invention to be longitudinally oriented either way; that is, with its taller end wall either fore or aft, whichever best accommodates the pedal configuration of the vehicle on which it is installed.

The qualitative and quantitative nature of the fit between the accelerator pedal and the vehicle floor is determined by the wedge angle between the top wall 26 and the bottom wall 12 and also by the height of the shorter aft end wall 18 and the height of the taller fore end wall 16. Furthermore, the wedge angle is itself a function of the combination of the height of the two end walls and the length of the device. We have found that, in order to be able to operably cooperate with the broad spectrum of accelerator pedal configurations, it is desirable that some dimensional relationships be maintained in embodiments of the invention.

In order to accomplish the desired universality of embodiments of the invention, it is desirable that the wedge angle is at least substantially 9° in order to have an effective wedge shape and not more than substantially 17° so that depression of the pedal against it does not cause the device to slide longitudinally along the floor and so that it will fit and be retained properly under most accelerator pedals. More desirably, the wedge angle is substantially in the range of 11° to 15°. Most preferred is a wedge angle of substantially 13°.

As noted above, the variations in accelerator pedal configurations among manufacturers includes variations in the angle of orientation of their accelerator pedals with respect to the vehicle floor. Additionally, as most accelerator pedals are depressed, that angle of orientation changes. The rockability of the living hinges 16 and 20 allows the device, and in particular its bottom wall and top wall, to conform more easily to the variety of angles that undepressed pedals of different vehicles make with respect to the vehicle floor. The rockability provided by the living hinges 16 and 20 also allow the device to conform with less force resistance to changes in the pedal angle as the pedal is depressed. The inwardly extending characteristic of the living hinges 16 and 20 provides somewhat of a fulcrum or lateral pivot axis that is interposed between the extreme ends of the device which enhances rockability. The inwardly extending characteristic of the living hinges 16 and 20 also cooperates with the side walls so that the end walls and the side walls do not make contact and interfere with each other when the device is compressed by the accelerator pedal, as described above. The inwardly extending characteristic of the living hinges 16 and 20 also prevents the end walls from expanding longitudinally outwardly in the fore and aft direction. Such longitudinal expansion could cause the device to strike or interfere with a driver's foot, an accelerator hinge or even an accelerator linkage rod that passes through the vehicle floor.

The rockability of the preferred embodiment of FIGS. 1 through 7 is illustrated diagrammatically in FIGS. 8 and 9. In both figures the solid lines show the undepressed, relaxed air container 10. In FIG. 8, the phantom lines show the device rocked in the aft direction with its aft end wall 18 being reduced in height and its fore end wall 16 increased in height. Desirably it rocks aft with little force resistance from its preferred wedge angle of 13° to an angle of 18° between its bottom wall 12 and its top wall 26. That provides a change in the wedge angle of 5°. In FIG. 9 the phantom lines show the device rocked in the fore direction. Desirably it rocks forward with little force resistance from its preferred wedge angle of 13° to an orientation making an opposite angle of 13° between its bottom wall 12 and its top wall 26. That forward rocking rotates the top wall 26 through an angle of 28°.

Height. It is desirable that the signal device of the invention have an interference fit between the floor and the accelerator pedal so that the signal device not only contacts both the pedal and the floor but also is held between them in a state of compression. If the pedal makes an angle with the floor that is different from the wedge angle of the device, then the desirable interference fit can still occur over a range of pedal angles and pedal spacings from the floor. For example, an undepressed pedal can contact a signal device so as to contact and compress the device all along the entire length of its top wall or so as to contact and compress the device only along a portion of its top wall. The undepressed pedal may contact and slightly compress only the higher end or may contact and compress only the lower end. That additional consequence of the wedge shape helps allow a single device to be more universally operable over a variety of pedal configurations.

Another desirable consequence of the wedge shape is that, if the top wall of the device makes contact with an undepressed pedal only near one end wall of the device, then as the pedal is depressed, the area of contact between the pedal and the top wall of the device expands toward the opposite end of the device. Over that range of pedal depression and contact migration, the additional force applied upwardly on the pedal by the device is smoothly gradual and minimum. There is no abrupt change in the force that the driver must apply to further depress the accelerator pedal.

In order to provide a signal device that is usable as universally as possible, there are preferred dimension ranges and most preferred dimensions for the device. For Standard Overhead pedals those dimensions are:

height at lower aft end: range of 1" to 3½"; preferred 2½"
height at higher fore end: range of 3¼" to 4¾"; prefer 3½"
length: range of 2½" to 5"; prefer 4"

Not all combinations of these three dimension ranges are practical. For example, the wedge angle should not be too steep or the device may be forced to slide along the floor by depression of a pedal. These dimensional ranges are best confined to the wedge angle range criteria described above.

Trough. Some accelerator pedals used in an overhead linkage configuration have a protrusion extending downwardly from the underside of the pedal. These protrusions occur in various locations on different vehicle makes and models. In order to accommodate these protruding objects, a longitudinal trough 36 is formed in the top wall 26 preferably along its center and extending along its entire length. The trough 36 allows essentially any such protrusion to protrude into the trough 36 so that the surfaces of the top wall 26 on opposite sides of the trough 36 can contact the underside of the accelerator pedal. The protrusion also cooperates with the trough to retain the signal device from sliding laterally from beneath the pedal.

Sensitivity and Pressure Relief. The sensitivity adjustment valve 30 is an air escape valve that is adjustable to vary the cross sectional area of an air path through the valve and thereby vary the air flow rate through the valve 30 and out of the device when the device 10 is compressed. Control of that air flow rate allows control of the selected rate of pedal depression that will cause the whistle to emit a sound. The air valve 30 therefore allows the driver to set the sensitivity to the rate of pedal depression at which the driver wants the whistle to make sound. The valve 30 also provides a path, in addition to the whistle, for air to enter the device when it is released and expands toward its relaxed state upon deceleration.

The detailed structure of the sensitivity adjustment valve 30 is illustrated in FIGS. 10 through 14. It has an integrally molded tubular inner component 50 illustrated in FIGS. 10 and 11 and an integrally molded tubular outer component 52 illustrated in FIGS. 12 and 13. The inner component 50 fits telescopically within the outer component 52 and can be rotated within it. They are shown assembled in FIG. 14.

The inner component 50 has a cylindrical barrel 54 having a closed end 51 that extends into the interior of the air container device 10. The opposite exposed end is a winged cap 56 which allows the entire inner component 50 to be manually rotated by the user for adjusting the cross sectional area of the air path through the valve. The winged cap 56 has an opening 57 allowing air passage between the interior of the barrel 54 and the ambient atmosphere. Retaining tabs 58 protrude radially outwardly from the interior end 51 of the barrel 54 to retain the inner component within the outer component 52. An opening 60 is formed through the wall of the barrel 54.

One side of the opening 60 has a stepped edge 62. A longitudinally elongated detent 64 extends outwardly from the barrel 54.

The outer component 52 has open opposite ends 66 and 68. Inside the end 68 are formed a series of five angularly spaced, longitudinally aligned channels 70, each with an arcuate cross section and extending into the inner wall of the outer component 52. When the valve 30 is assembled, the detent 64 slides into one of the channels 70. The channels 70 and the detent 64 are dimensioned to allow the inner component 50 to be rotated to move the detent 64 into any of the channels 70. However, between the channels 70 the interior wall of the outer component 52 is dimensioned to extend radially inwardly enough to require a manually exerted torque on the winged end 56 in order to move the detent to a neighboring channel 70. In this manner, the valve 30, as illustrated, has five angular positions of rotation to which it can be manually adjusted and retained in the selected position. It should be apparent, however, that any number of channels and corresponding angular positions can be used. In fact we believe that seven angular positions would be optimum and specifics about those seven are described below. Alternatively, the channels and their discrete positions can be eliminated and the inner component 50 can simply be held against rotation by sufficient friction that will also permit continuous rotation and therefore continuous adjustment to the angular position of the inner component 50 within the outer component 52.

The outer component 52 has a rectangular, elongated, longitudinally extending opening 72. However, the opening 72 is circumferentially narrower than the stepped opening 60 of the inner component 50. In particular, the circumferential width of the opening 72 is approximately the same as the circumferential width of each of the four steps 62 in the stepped opening 60 of the inner component 50. Appropriate angular alignment of the detent 64, the channels 70, the steps 62 and the opening 72, will allow the rectangular opening 72 to register with a different one of the steps 62 in four of the five positions of the detent 64. The fifth position of the detent 64 aligns the rectangular opening 72 with a portion of the wall of barrel 54 to nearly close the air passage that extends through the stepped opening 60 and the rectangular opening 72. The position with the smallest opening is the position for the maximum sensitivity which will emit an audible signal for the smallest selected increase in acceleration. The position with the largest opening will require the largest increase in acceleration before emitting an audible signal. Of course there can be other quantities of steps in the opening 60. For the alternative embodiment that was described above and has a continuously variable sensitivity instead of a sensitivity that has discrete increments, the stepped configuration of the edge of the opening 60 can be replaced with an inclined or smoothly continuous edge.

The openings in the inner and outer components allow air to pass from within the container 10 through the elongated rectangular opening in the outer component 52, the opening 60 in the inner component 50, longitudinally through the barrel 54 and out the opening 57 in the winged cap 56. The flow resistance of that air flow path is controlled by rotation of the inner component 50 relative to the outer component 52 to vary the angular position at which the elongated opening 72 registers with the opening 60.

The whistle 28, like any air operated audible signal, requires a minimum pressure to generate a sound. Pressure within the air container device 10 of the invention is a function of both the rate of compression (squeeze) of the device and the rate of outflow of air through the sensitivity adjustment valve 30. The rate of air outflow is a function of the cross sectional area of the passage through the sensitivity adjustment valve 30. Therefore, for a particular whistle, the range of air passage cross sectional area as well as the incremental changes in cross sectional area between the adjustment positions are important for providing a sensitivity adjustment that gives meaningful variations distributed across a useful range of sensitivities. For the preferred embodiment of the invention, we have found it preferable to have seven discrete positions of sensitivity adjustment. The following is a specific example that describes the preferred passage cross sectional areas for the sensitivity adjustment valve and also illustrates the relationships between the air passage cross sectional areas for the discrete positions of adjustment.

Position 0: ("Closed" position) Open area ~0.00175 in$^2$—most sensitive.
Position 1: Open area 0.0035 in$^2$
Position 2: Open area 0.00525 in$^2$
Position 3: Open area 0.00713 in$^2$
Position 4: Open area 0.01425 in$^2$
Position 5: Open area 0.02138 in$^2$
Position 6: Open area 0.0285 in$^2$—least sensitive In order to avoid a potential but unlikely hazard, there is no adjustment that completely blocks all air escape through the sensitivity adjustment valve 30. Even the "closed" position 0 allows some air escape. It is possible that a sudden depression of the accelerator pedal at a sufficiently high rate of depression would cause the reed of a whistle to seat and block air escape instead of vibrating. With the whistle blocked, if no air could escape from the air container 10 through the air valve 30, the air container would become very stiff and could prevent depression of the accelerator pedal. In order to avoid that hazard, the sensitivity adjustment valve is constructed so that it can not be fully closed. That assures that the device will compress and not block depression of the pedal, so that the driver can maintain full control. Additionally, if the sensitivity adjustment valve 30 could be entirely closed, the device could become too sensitive and emit an audible signal even for fuel efficient acceleration.

Mini. Some manufacturers, including many European manufacturers, produce vehicles with accelerator pedals that hinge at their lower aft end. The carburetor linkage to the pedal extends upwardly through the floor and connects to the underside of the pedal below the ball of the operator's foot. With this hinged pedal configuration, the height of the pedal above the floor at the aft end of the pedal is considerably less than with the overhead linkage configuration. Another difference is that the linkage is between the floor and the pedal and, for some configurations, would interfere with the positioning and retention of the preferred air container device 10 described above. Yet another difference is that the hinged pedal does not have the freedom to rock in the manner of the overhead linked pedal.

FIGS. 15 through 19 illustrate a smaller alternative embodiment of the invention that is particularly adapted to a hinged accelerator configuration. Like the preferred embodiment of FIGS. 1-9, this alternative device is a flexible walled, self supporting, unitary, one piece, wedge shaped, air container 79 formed of component walls that are blended and sealingly connected together. In its operable installation it is wedged, preferably in slight compression, between an accelerator pedal and the vehicle floor. The component walls include a bottom wall 82, top wall 84, and side walls 86 and 88 that are outwardly bowed. The device 79 has a shorter aft end wall 90 and a higher fore end wall 92 both of which are outwardly bowed. Both an air operated whistle 96 and a sensitivity adjustment valve 98, like those described for the preferred embodiment, are mounted through respective holes through the living hinge 94.

Preferably, the wedge angle between the top wall 84 and the bottom wall 82 is in the range of 17° to 31°, the length from end wall to end wall is in the range of 3.2" to 5.5" and a height in the range of 1.5" to 2.5". Confining the dimensions of the signaling device 79 of FIGS. 15-19 to within these ranges makes the signaling device nearly universally installable in available accelerator pedal and linkage configurations. Most preferably, the wedge angle is substantially 24°, the length from end wall to end wall is substantially 4.7" and the height is substantially 2".

The signaling device 79 of FIGS. 15-19 has a longitudinal trough 100 is formed in the top wall 84 and preferably extends from the fore end wall 92 to the aft end wall 90. This trough has the same purpose and functions in the same manner as the trough described above for the signaling device of FIGS. 1-9. A fastener, such as a hooks and loops fastener, can be applied to the bottom wall 82 for removable attachment of the device 79 to the vehicle floor for the same reasons and function as described above for the signaling device of FIGS. 1-9.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A fuel efficiency signal device for being interposed between the accelerator pedal of a vehicle and a floor below the pedal, the device signaling to a driver when an accelerator is depressed at a rate equal to or exceeding a selected rate of depression, the signal device comprising:
   (a) wedge shaped, flexible walled, self supporting air container having walls sealingly connected to adjacent walls to form the air container, the walls, in an installed orientation, comprising,
      (i) a bottom wall;
      (ii) a fore end wall extending upwardly from the bottom wall;
      (iii) an aft end wall extending upwardly from the bottom wall;
      (iv) a pair of opposite side walls extending upwardly from the bottom wall and joined to the end walls, each side wall being outwardly bowed and
      (v) a top wall inclined at a wedge angle to the bottom wall and joining the side walls and the end walls;
   (b) a whistle in one of the walls of the air container having an air passage for escape of air through the passage and thereby generating a sound when the air pressure exceeds a selected air pressure as a result of compression of the signal device by the accelerator pedal at a rate equal to or exceeding a selected rate of depression of the accelerator pedal; and
   (c) an adjustable air escape valve in a wall of the device for adjustably varying the air flow rate through the air escape valve and thereby adjustably selecting the selected rate of depression.

2. A device in accordance with claim 1 wherein at least one of the end walls is formed with a lateral, inwardly extending living hinge.

3. A device in accordance with claim 2 wherein the wedge angle between the top wall and the bottom wall is in the range of 9° to 17°.

4. A device in accordance with claim 3 wherein the wedge angle is substantially 13°.

5. A device in accordance with claim 2 wherein both end walls are formed with a lateral, inwardly extending living hinge and wherein the living hinges are in a rounded v-shape.

6. A device in accordance with claim 5 wherein the outwardly bowed side walls have a v-shape in cross section in a plane perpendicular to the side walls and intersecting the top wall and the bottom wall and, in planes generally parallel to the bottom wall, the side walls curve from the fore end wall to the aft end wall.

7. A device in accordance with claim 6 wherein a longitudinal trough is formed in the top wall from the fore end wall to the aft end wall.

8. A device in accordance with claim 7 wherein the wedge angle between the top wall and the bottom wall is in the range of 9° to 17°.

9. A device in accordance with claim 8 wherein the wedge angle is substantially 13°.

10. A device in accordance with claim 8 wherein the device has a height at its aft end wall in the range of 1" to 3½", a height at its fore end wall in the range of 3¼" to 4¾" and a length along its bottom wall in the range of 2½" to 5".

11. A device in accordance with claim 8 wherein the air container is one unitary piece.

12. A device in accordance with claim 8 wherein a hook and loop fastener is attached on exterior of the bottom wall.

13. A device in accordance with claim 1 wherein the fore and aft walls are outwardly bowed and the wedge angle between the top wall and the bottom wall is in the range of 17° to 31°, the length from end wall to end wall is in the range of 3.2" to 5.5" and a height in the range of 1.5" to 2.5".

14. A device in accordance with claim 13 wherein a hook and loop fastener is attached on exterior of the bottom wall.

15. A device in accordance with claim 13 wherein the wedge angle is substantially 24°, the length from end wall to end wall is substantially 4.7" and the height is substantially 2".

16. A device in accordance with claim 13 wherein a longitudinal trough is formed in the top wall from the fore end wall to the aft end wall.

17. A device in accordance with claim 13 wherein the air container is one unitary piece.

18. A device in accordance with claim 17 wherein a hook and loop fastener is attached on exterior of the bottom wall.

19. A device in accordance with claim 1 wherein the adjustable air escape valve comprises an integrally molded tubular outer component and an integrally molded tubular inner component fitting telescopically and rotatably within the outer component, and wherein
   the inner component includes a cylindrical barrel having a closed end extending into the interior of the air container and an opposite exteriorly exposed end formed as a winged cap having an opening through the cap, the barrel having an opening through a wall of the barrel, one side of the opening having a stepped or inclined edge; and
   the outer component has a longitudinally extending opening that is circumferentially narrower than the opening of the inner component.

* * * * *